(12) United States Patent
Montgomery et al.

(10) Patent No.: US 7,683,830 B2
(45) Date of Patent: Mar. 23, 2010

(54) ANTENNA COMBINATION TECHNIQUE FOR MULTI-FREQUENCY RECEPTION

(75) Inventors: Paul Y. Montgomery, Menlo Park, CA (US); David G. Lawrence, Santa Clara, CA (US)

(73) Assignee: Novariant, Inc., Menlo Park, CA (US)

( * ) Notice: Subject to any disclaimer, the term of this patent is extended or adjusted under 35 U.S.C. 154(b) by 54 days.

(21) Appl. No.: 11/499,544

(22) Filed: Aug. 4, 2006

(65) Prior Publication Data

US 2010/0045522 A1 Feb. 25, 2010

(51) Int. Cl.
*G01S 1/00* (2006.01)
(52) U.S. Cl. .............................. 342/357.06; 342/357.12
(58) Field of Classification Search ......... 342/463–465, 342/387, 464, 362, 385, 386, 357.01–357.14, 342/457
See application file for complete search history.

(56) References Cited

U.S. PATENT DOCUMENTS

| | | | | |
|---|---|---|---|---|
| 5,185,610 | A * | 2/1993 | Ward et al. | 342/357.11 |
| 6,005,514 | A * | 12/1999 | Lightsey | 342/365 |
| 6,449,558 | B1 | 9/2002 | Small | |
| 6,784,830 | B1 * | 8/2004 | Lawrence et al. | 342/357.12 |
| 2004/0176102 | A1 * | 9/2004 | Lawrence et al. | 455/456.1 |
| 2005/0242990 | A1 * | 11/2005 | Lawrence et al. | 342/357.12 |
| 2006/0022869 | A1 | 2/2006 | Zimmerman et al. | |
| 2006/0022870 | A1 | 2/2006 | Zimmerman et al. | |
| 2006/0022871 | A1 | 2/2006 | Zimmerman | |
| 2006/0022872 | A1 * | 2/2006 | Zimmerman | 342/464 |
| 2006/0022873 | A1 | 2/2006 | Zimmerman | |
| 2006/0227905 | A1 * | 10/2006 | Kunysz et al. | 375/345 |
| 2007/0075896 | A1 * | 4/2007 | Whitehead et al. | 342/357.11 |
| 2007/0230268 | A1 * | 10/2007 | Hoogeveen et al. | 367/19 |

FOREIGN PATENT DOCUMENTS

| | | |
|---|---|---|
| WO | WO 99/63358 | 5/1999 |
| WO | WO 2005/012935 | 2/2005 |

OTHER PUBLICATIONS

U.S. Appl. No. 10/909,140, filed Jul. 30, 2004, Bauregger et al.
U.S. Appl. No. 10/909,184, filed Jul. 30, 2004, Zimmerman et al.
U.S. Appl. No. 10/909,243, filed Jul. 30, 2004, Zimmerman et al.
Barnes, J., et al., "High Precision Indoor and Outdoor Positioning using LocataNet," School of Surveying and Spatial Information Systems, The University of New South Wales, Australia (UNSW).

(Continued)

*Primary Examiner*—Thomas H Tarcza
*Assistant Examiner*—Harry Liu
(74) *Attorney, Agent, or Firm*—Perkins Coie LLP

(57) ABSTRACT

A set of receiver antennas, of which at least one of the receiver antennas has the capability of receiving frequencies that another receiver antenna from the set is incapable of receiving, is used for determining position and orientation in a navigation system.

33 Claims, 4 Drawing Sheets

OTHER PUBLICATIONS

Barnes, J., et al., "Locata: a New Positioning Technology for High Precision Indoor and Outdoor Positioning," School of Surveying and Spatial Information Systems, The University of New South Wales, Australia (UNSW).

Barnes, J., et al., "*LocataNet*: Intelligent time-synchronised pseudolite transceivers for cm-level stand-alone positioning," Satellite Navigation and Positioning (SNAP) Group, School of Surveying and Spatial Information Systems, The University of New South Wales, Australia (UNSW).

LeMaster, E.Al, "Self-Calibrating Pseudolite Arrays: Theory and Experiment," A dissertation submitted to the Department of Aeronautics and Astronautics, (May 2002).

Matsuoka, M., "Mars Rover Navigation Using Pseudolite Transceiver Arrays: Network-Based Ranging and Extended Self-Calibration Algorithm," A dissertation submitted to the Department of Aeronautics and Astronautics (Mar. 2005).

Trimbel News Release, entitled Trimble Introduces New Surveying Products For the Connected Survey Site, (Oct. 2005).

* cited by examiner

ANTENNA COMBINATION TECHNIQUE FOR MULTI-FREQUENCY RECEPTION

CROSS-REFERENCE TO RELATED APPLICATIONS

The present application is related to the concurrently filed application entitled, Modular Multi-frequency GNSS Receiver, by inventor, David Lawrence, U.S. application Ser. No. 11/499,826, filed on Aug. 4, 2006, the entire contents of which are hereby incorporated by reference as if fully set forth herein.

TECHNICAL FIELD

The present invention is directed to precise local positioning systems, and more specifically to navigation systems that use a combination of receiver antennas to achieve multi-frequency reception.

BACKGROUND

Current non-military Global Positioning Systems (GPS) use L1/L2 dual frequency antennas. Dual frequency antennas are more difficult to design and manufacture than are single frequency antennas. Hence, dual frequency antennas command a premium price. Thus, it is reasonable to assume that antennas that can receive signals at three or more frequencies are all the more complex and expensive to design.

With the advent of modernization of GPS, GPS satellites are on track to offer more frequencies, such as unencrypted L2 and L5 signals. Further, future Global Navigation Satellite System (GNSS) constellations are expected to offer more frequencies than are available from present day GPS constellations. For example, Galileo will offer signals at 1278.75 MHz and 1207.14 MHz. Thus, it is likely that antennas with a passband at three or more frequencies will be needed in the near future. In this context, a passband refers to a frequency band selection property of the antenna, wherein, radio signals in the range of frequencies of the passband are passed (admitted), but radio signals outside of the range of frequencies of the passband are attenuated (rejected). In general, the passband characteristics of an antenna are determined by one or more of: the antenna element and ground-plane design, the optional amplifier and the optional filtering electronics. In addition to being expensive, multi-passband antennas are expected to perform less well than antennas that operate at only one or two passbands.

Likely performance degradation of multi-passband antennas involve design attributes such as:

Multipath mitigation at all frequencies
Antenna gain as a function of frequency and antenna relative azimuth and/or elevation
Phase center collocation at different frequency bands
Phase center stability Based on the foregoing, there is a need for a system that achieves the benefits of an antenna that operates at a multiplicity of passbands without the expense, design complexity and performance degradation that are usually associated with multi-passband antennas.

SUMMARY OF THE INVENTION

According to one aspect of certain non-limiting embodiments, a system for determining position and/or orientation includes a plurality of GNSS receiver antennas, of which at least one of the GNSS receiver antennas has the capability of receiving frequencies that another GNSS receiver antenna from the plurality of GNSS receiver antennas is incapable of receiving. According to another aspect of certain non-limiting embodiments, a method for determining position and/or orientation includes using a plurality of GNSS receiver antennas, of which at least one of the GNSS receiver antennas has the capability of receiving frequencies that another GNSS receiver antenna from the plurality of GNSS receiver antennas is incapable of receiving.

DETAILED DESCRIPTION

Modern GPS and GNSS systems are reasonably expected to make available a multiplicity of frequencies for use in navigation systems. Multiple frequencies are used in the navigation domain for two principal reasons:

To enable the rapid and correct resolution of cycle ambiguities between a pair of receiver antennas that are tracking a set of ranging sources.
To estimate ranging errors introduced by the ionosphere.

For each frequency, a set of cycle ambiguities must be resolved.

Additional frequencies provide additional information that allows these sets of integer ambiguities to be resolved both more quickly and with higher integrity than at a single frequency alone.

The determination of correct cycle ambiguities allows a user to employ the carrier wave of the transmitted signal in the position solution to achieve high accuracy positioning, known in the industry as "Real Time Kinematic" (RTK). In the RTK mode, the integer cycle ambiguities between a pair of antennas on a frequency are resolved.

In addition to improved integer ambiguity resolution, the presence of multiple frequencies allows estimation of ranging errors introduced by the ionosphere. By independently measuring the delay of widely spaced frequencies, the Total Electron Content (TEC) along the path from the transmitter (satellite) to the receiver can be directly measured.

According to certain embodiments, an antenna may comprise either one element or two stacked elements that admit signals in either one or two defined radio frequency bands, and where the elements are packed together with a spacing of less than 0.1 cycles of (the lesser of) the characteristic frequency wavelength. In general, such an antenna is packaged together with optional amplification and filtering electronics into an antenna entity. A non-limiting example of such an antenna is an L1 patch element stacked atop an L2 patch element and packaged together with optional amplification and filtering electronics.

According to certain other embodiments, an antenna may comprise a set of independent antenna elements affixed in a known arrangement to a rigid substrate, wherein each element is separated from all other elements by a spacing in excess of 0.1 cycles (the greater on the characteristic frequency wavelength. The antenna assembly may optionally include amplification and electronic filtering components. In this embodiment, the assembly is packaged as a single antenna entity. A non-limiting example of such an assembly includes six L1 antenna elements arranged in a hexagon on a flat rigid substrate, on a circle of diameter 20 cm. At the center of the circle is affixed a single L2 antenna element. The assembly is packaged with optional amplification and filtering electronics.

Figure 1:
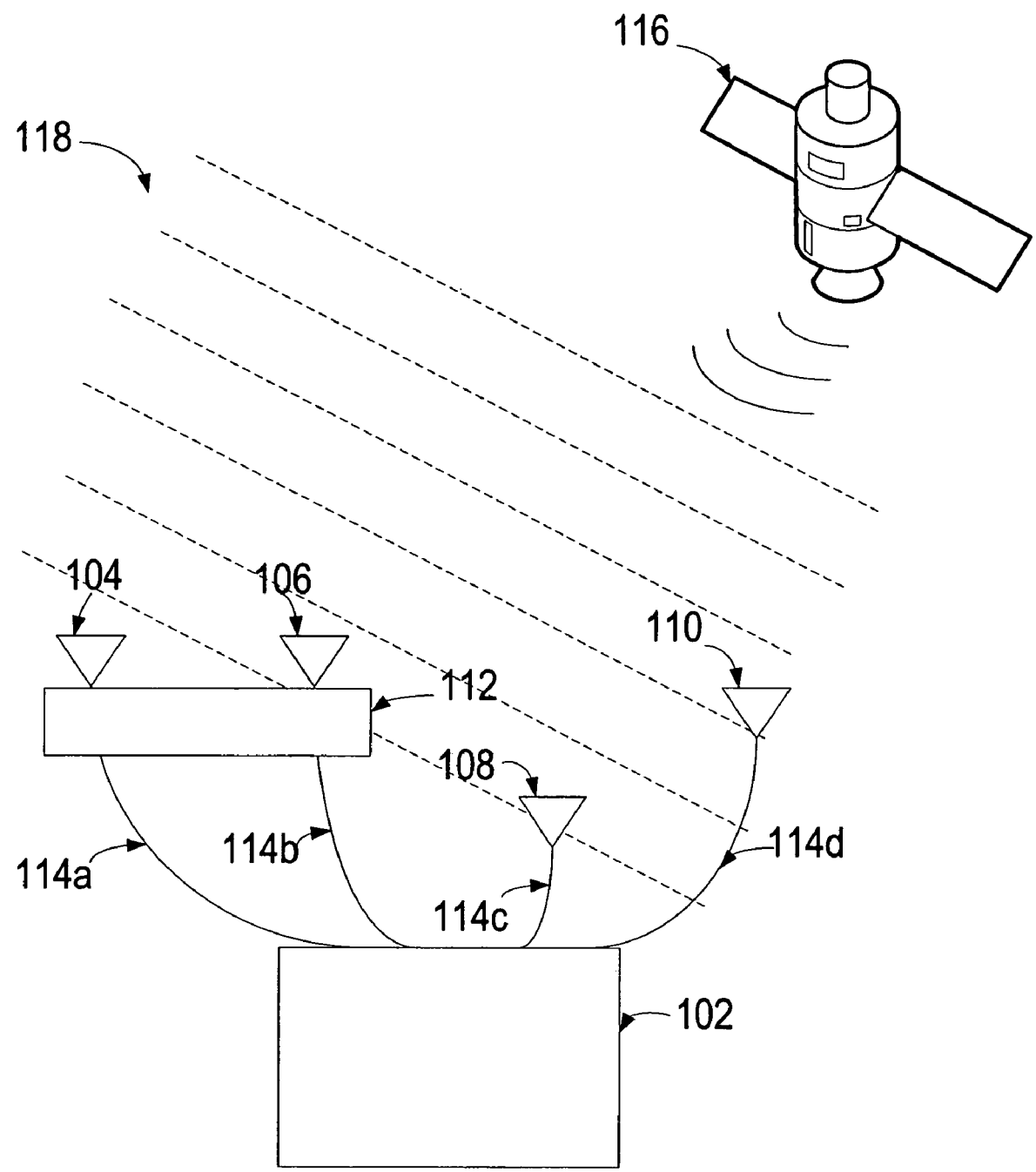
FIG. 1 is a block diagram that illustrates the use of a set of receiver antennas with different passband capabilities in lieu of a single receiver antenna that can receive signals in at least three passbands, according to certain embodiments of the invention.

FIG. 1 is a block diagram that illustrates the use of a set of receiver antennas with different passband capabilities in lieu of a single receiver antenna that can receive signals in at least three passbands, according to certain embodiments of the invention. FIG. 1 shows a receiver 102, receiver antennas 104, 106, 108 and 110, a GNSS or GPS satellite 116. Receiver antennas 104 and 106 are mounted on a rigid array 112. Receiver antennas 104, 106, 108 and 110 are connected to receiver 102 by corresponding radio frequency (RF) cables 114a, 114b, 114c and 114d. Wave fronts of carrier phase data that are transmitted by satellite 116 are denoted by dashed lines 118. The embodiments are not restricted to four receiver antennas, one receiver or to one satellite. The number of receivers, receiver antennas and satellites may vary from implementation to implementation.

According to certain embodiments, receiver antennas 104, 106, 108 and 110 in the system are such that at least one of the receiver antennas is capable of receiving signals in a frequency band that another receiver antenna in the system is not capable of receiving and vice versa. In other words, at least one pair of the receiver antennas in the system has complementary frequency capability. Complementary frequency capability among two or more receiver antennas in a system means that at least one receiver antenna has the ability to receive signals in a frequency band that is not received by the other receiver antennas in the system.

According to certain embodiments, each of the receiver antennas 104, 106, 108 and 110 can receive signals in at least one passband, and when taken in combination, the receiver antennas are capable of receiving signals in at least three passbands. According to another embodiment, each of the receiver antennas 104, 106, 108 and 110 can receive signals in only one passband, and when taken in combination, the receiver antennas are capable of receiving signals in at least two passbands. Candidate frequency bands may include GPS L1, L2 and L5 bands, Galileo E1, E2, E5 and E6 bands, as well as frequency bands of Russia's GLONASS and China's BEIDOU constellations.

According to certain embodiments, each receiver antenna is a single or dual frequency combination that provides optimized performance and minimum complexity and cost. The selection of single and/or dual frequency receiver antennas is employed to cover the desired frequency bands. However, the embodiments are not limited to single or dual frequency receiver antennas. In certain embodiments, receiver antennas that can receive three or more frequencies may be used depending on availability and cost. As an illustrative example, in a system of three receiver antennas (as distinct from transmitter antennas), one of the receiver antennas may receive L1/L2 signals, a second receiver antenna may receive L1/L5 signals, and the third antenna may receive L1/E1/E2/E5 signals. By employing a plurality of such receiver antennas, each covering a different combination of frequencies, all desired passbands can be covered.

With reference to FIG. 1, for purposes of explanation, assume that satellite 116 is a GPS satellite and that receiver antennas 104, 106, 108 and 110 can receive signals in L1/L2, L1/L5, L1, and L5 respectively. The use of such a set of receiver antennas provides flexibility in antenna design particularly if some of the receiver antennas have been previously deployed as part of a legacy system. Such a set of receiver antennas can achieve the benefits of a single but more complex and expensive receiver antenna that can receive signals in three or more passbands.

A baseline is defined to be the vector between a pair of receiver antennas. A baseline can be of fixed length or of variable length. The baseline between receiver antennas 104 and 108 is of variable length. In the case of receiver antennas 104 and 106 that are mounted on rigid array 112, the baseline is of fixed length and is the vector between receiver antennas 104 and 106. The known baseline between receiver antennas 104 and 106, together with the relative position of the receiver antennas, can be used to determine the attitude of the rigid array 112 in space. The attitude may be determined by comparing the difference in carrier phases at the common frequency measured between a set of receiver antennas, together with the known line of sight to a plurality of transmitted signal sources. With two receiver antennas on the rigid array, two components of the array attitude can be determined. For example, the azimuth and roll angles of the array attitude can be determined. With three or more receiver antennas on the rigid array, it is possible to determine all three components (azimuth, pitch and roll angles) of the array attitude. The known attitude of the antenna array can be used to map the phase measurements from each receiver antenna to a common point where the received signals from all antennas can be compared. The use of a rigid array with two receiver antennas is described in greater detail herein with reference to FIG. 2.

In the case where the baselines are of variable length, the relative position among pairs of receiver antennas can be solved. As a non-limiting example, assume that one of the receiver antennas in the system is a base station receiver antenna at a fixed location. Further assume that another receiver antenna in the system is a roving receiver antenna. For example, the roving receiver antenna may be associated with a vehicle. It is desired to find the relative position between the base station receiver antenna and the roving receiver antenna, for example, in order to position the vehicle in the field. The use of a roving receiver antenna in combination with a base station receiver antenna is described in greater detail herein with reference to FIG. 3.

According to another non-limiting example, two receiver antennas are mounted on a vehicle and the baseline between the two receiver antennas is of variable length. A third receiver antenna in the system is a base station receiver antenna at a fixed location. The use of two receiver antennas of a variable length baseline on a vehicle in conjunction with a base station receiver antenna at a fixed location is described in greater detail herein with reference to FIG. 4.

The design of a system of receiver antennas may vary from implementation to implementation. The following non-limiting examples exemplify antenna system design:

1. An antenna system design for determining a fixed baseline attitude, as described herein with reference to FIG. 2.

2. An antenna system design for determining a variable baseline position relative to a fixed base station, as described herein with reference to FIG. 3.
3. An antenna system design for determining a variable baseline position between antennas that are separated by an articulated joint, as described herein with reference to FIG. 4.

Figure 2:
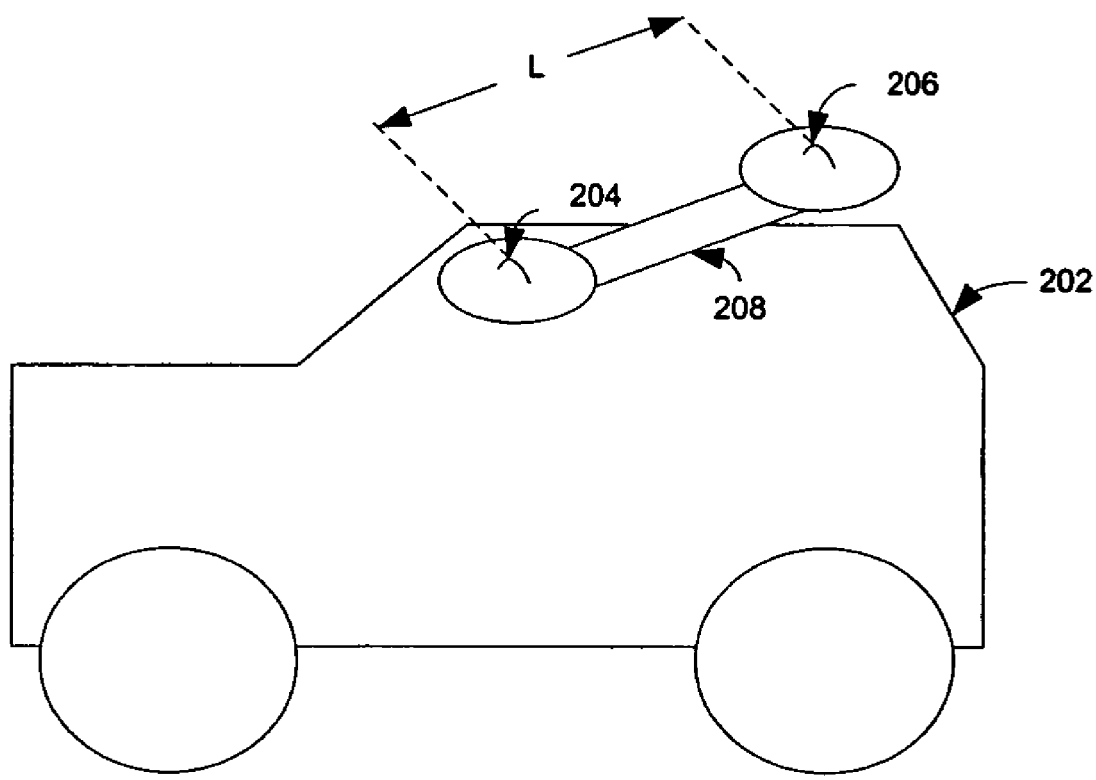
FIG. 2 is a block diagram that illustrates an antenna system design for determining a fixed baseline attitude, according to certain non-limiting embodiments.
Figure 3:
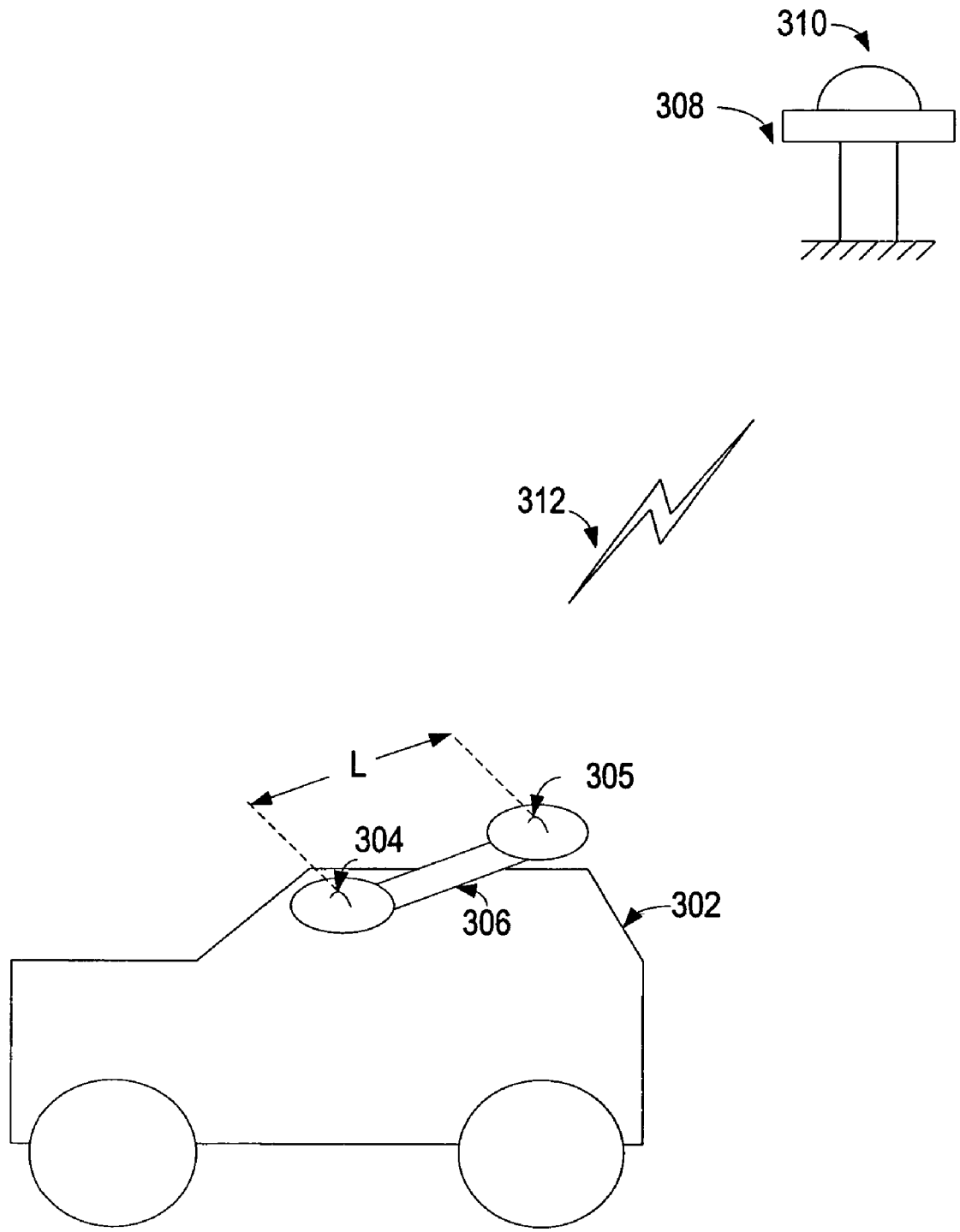
FIG. 3 is a block diagram that illustrates an antenna system design for determining a variable baseline position relative to a fixed base station, according to certain non-limiting embodiments.
Figure 4:
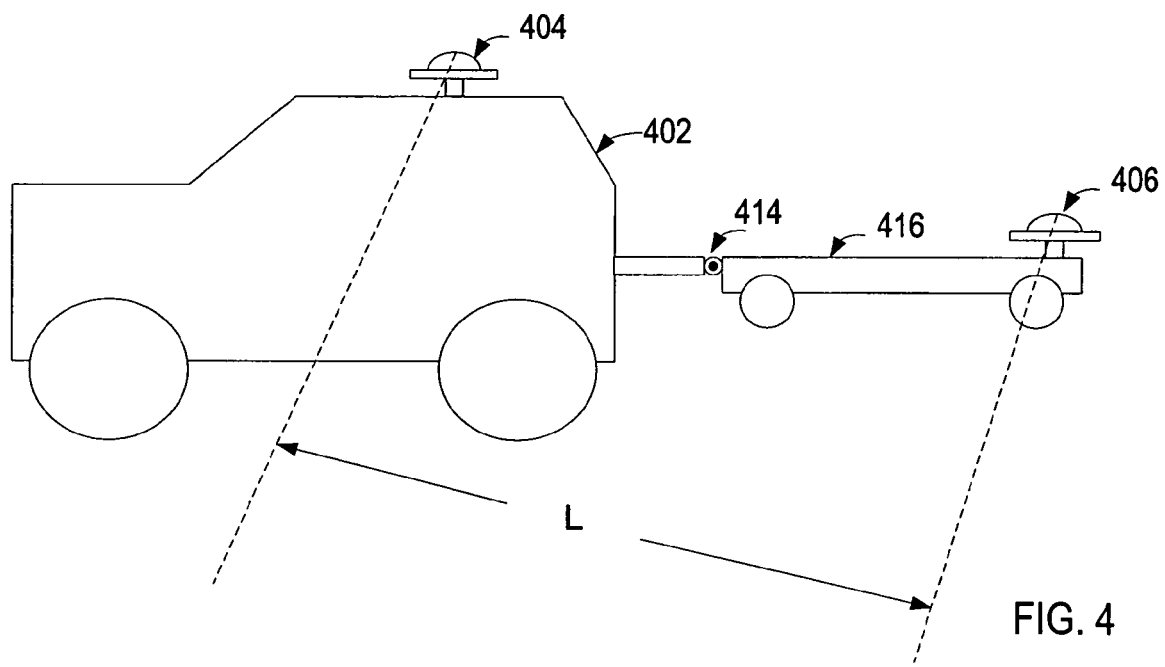
FIG. 4 is a block diagram that illustrates an antenna system design for determining a variable baseline position between antennas that are separated by an articulated joint, according to certain non-limiting embodiments.

For purposes of explanation, FIG. 2, FIG. 3 and FIG. 4 are described with reference to GPS frequencies L1, L2 and L5. The embodiments are not limited to GPS frequencies. Other suitable frequencies include Galileo and GLONASS frequencies.

FIG. 2 is a block diagram that illustrates an antenna system design for determining a fixed baseline attitude, according to certain non-limiting embodiments. FIG. 2 shows a vehicle 202, and receiver antennas 204, 206 mounted on a rigid array 208, that in turn is mounted on vehicle 202. Receiver antenna 204 is separated from receiver antenna 206 by a fixed known distance, L. For purposes of explanation, assume that receiver antenna 204 is a dual frequency receiver antenna and can receive L1/L2 signals. Further assume that receiver antenna 206 is also a dual frequency receiver antenna and can receive L1/L5 signals. The antenna system of FIG. 2 is capable of determining the azimuth and roll angle of rigid array 208. Because the rigid array 208, is mounted perpendicular to the vehicle centerline, the pitch component of the attitude of rigid array 208 is not observable in the design of FIG. 2. However, the pitch component can be readily resolved by using three or more receiver antennas in the system. The antenna system design of FIG. 2 allows a total of L1, L2 and L5 frequencies to be tracked by the system. The L1 phase difference between the antennas 204 and 206 is used to project the L2 and L5 phase measurements to a common point. The common point may be the phase center of one of the antennas 204 and 206. In this case, the receiver antenna with the phase center that is used as the projected common point is referred to as the master antenna.

FIG. 3 is a block diagram that illustrates an antenna system design for determining a variable baseline position relative to a fixed base station, according to certain non-limiting embodiments. FIG. 3 shows a vehicle 302, receiver antennas 304, 305, mounted on a rigid array 306, and a fixed base station 308. Fixed base station 308 uses a three-band integrated receiver antenna 310. Receiver antennas 304, and 305 are separated by a fixed known distance, L. As a non-limiting example, assume that the three-band integrated receiver antenna 310 receives L1/L2/L5 signals, and that receiver antenna 304 is a dual antenna and receives L1/L2 signals. Further, assume that receiver antenna 305 is also a dual antenna and receives L1/L5 signals. Fixed base station 308 transmits carrier and code phase data for each of the passbands, L1, L2 and L5, over a data channel 312 to the receiver antennas 304 and 306 on roving vehicle 302. Thus, L1, L2 and L5 frequencies can be tracked by the system. The L1 phase difference between receiver antennas 304 and 305 is used to project the L2 and L5 phase measurements to a common point. The common point may be the phase center of one of the receiver antennas 304 and 305. The carrier phase relationship between the L1, L2 and L5 frequencies can be used to resolve cycle ambiguities on all frequencies between the common projection point and base station antenna 310. As a non-limiting example, the relative positions of antennas 304 and 305 can be calculated given the differential L1 carrier phase and resolved L1 cycle ambiguities for that baseline. If the common point is the phase center of antenna 304, the L5 carrier phase measured at antenna 305 may be projected to the phase center of antenna 304 by adding the projection of the relative position vector (expressed in L5 cycles) onto the unit line of sight vector towards the satellite.

According to certain other embodiments, assume that the system of FIG. 3 included a third receiver antenna mounted on the fixed array 306. Further assume that each of the three receiver antennas is limited to receiving signals in only one frequency. For example, one receiver antenna receives L1 only signals, a second receiver antenna receives L2 only signals and the third receiver antenna receives L5 only signals. In such a case, L1, L2 and L5 frequencies can be tracked by the system and can be used to determine the position of vehicle 302 relative to the fixed L1/L2/L5 base station antenna 310.

FIG. 4 is a block diagram that illustrates an antenna system design for determining a variable baseline position between antennas that are separated by an articulated joint, according to certain non-limiting embodiments. FIG. 4 shows a vehicle 402, receiver antenna 404 mounted on vehicle 402, a towing implement 416 that is connected to vehicle 402 by an articulated joint 414, a receiver antenna 406 mounted on towing implement 416, and a fixed base station 408. Fixed base station 408 uses a three-band integrated receiver antenna 410. Because towing implement 416 is connected to vehicle 402 by the articulated joint 414, the distance between receiver antennas 404 and 406 can change with time. In other words, the position of receiver antennas 404 and 406 are not fixed in relation to each other. Thus, the distance L between receiver antennas 404 and 406 is a variable.

As a non-limiting example, assume that the three-band integrated receiver antenna 410 receives L1/L2/L5 signals, and that receiver antenna 404 is a dual antenna and receives L1/L2 signals. Further, assume that receiver antenna 406 is also a dual antenna and receives L1/L5 signals. Fixed base station 408 transmits carrier and code phase data for each of the passbands, L1, L2 and L5, over a data channel 412 to a computer which also receives carrier and code phase data from the receiver with antennas 404 and 406. Thus, L1, L2 and L5 frequencies can be tracked by the system. The L1 phase difference among the receiver antennas is used to project the L2 and L5 phase measurements to a common point. The common point may be the phase center of one of the receiver antennas. Thus, the relative position of receiver antennas 404 and 406 can be determined. The carrier phase relationship between the L1, L2 and L5 frequencies can be used to resolve cycle ambiguities on all frequencies between the common projection point and base station antenna 410.

In the foregoing specification, embodiments of the invention have been described with reference to numerous specific details that may vary from implementation to implementation. The specification and drawings are, accordingly, to be regarded in an illustrative rather than a restrictive sense.

The invention is intended to be as broad as the appended claims, including all equivalents thereto.

What is claimed is:
1. A navigation system for determining position of an array of receiver antennas, said navigation system comprising:
   a plurality of GNSS receiver antennas, wherein at least
      a first GNSS receiver antenna of said plurality of GNSS receiver antennas has mutually complementary frequency capability with respect to a second GNSS receiver antenna of said plurality of GNSS receiver antennas;
   wherein, the first GNSS receiver antenna is separated from the second GNSS antenna by a physical spacing of at least 0.1 cycles of a highest frequency wavelength operable with the plurality of GNSS receiver antennas; and wherein, phases from the first and second GNSS receiver antennas are projected to a common physical point based on a relative position between the first and second GNSS receiver antennas.

2. The navigation system of claim 1, wherein at least two antenna of said plurality of GNSS receiver antennas receive signals in one or more passbands, and when the at least two antennas are taken together, said plurality of GNSS receiver antennas receive signals in at least three passbands.

3. The navigation system of claim 1, wherein at least two antenna of said plurality of GNSS receiver antennas receives signals in one passband, and when taken together, said plurality of GNSS receiver antennas receive signals in at least two passbands.

4. The system of claim 1, wherein the first and second GNSS receiver antennae are physically distinct antenna.

5. The system as in claim 1, wherein the mutually complementary frequency capability of the first GNSS receiver antenna with respect to the second GNSS receiver antenna in the navigation system means that one of the first and second receiver antenna has the ability to receive signals in a frequency band that the other one of the first and second receiver antenna cannot receive.

6. The system as in claim 1,
wherein a first frequency received in a first frequency passband by the first receiver antenna that is not received by the second receiver antenna, and
a complementary other frequency in a second frequency passband received by the second receiver antenna that is not received by the first receiver antenna, are combined after being received to provide combined receiver antenna operation for the first frequency passband and the second frequency passband.

7. The system of claim 4, wherein the first GNSS receiver antenna is able to receive a signal in at least one passband that is not able to be received by the second GNSS receiver antenna.

8. The navigation system of claim 2, wherein said plurality of GNSS receiver antennas are mounted on a rigid array of known dimensions.

9. The navigation system of claim 8, wherein a pair of GNSS receiver antennas on said rigid array share a common passband and receive signals from one or more transmit sources that are transmitting in said common passband, and wherein a known attitude of said rigid array and a measured phase difference between said pair of GNSS receiver antennas are used to project phases from all passbands to the common physical point.

10. The navigation system of claim 8, wherein the rigid array has a known attitude is used for projecting phase data from one or more of said plurality of GNSS receiver antennas to the common physical point.

11. The navigation system of claim 10, wherein said common physical point is a phase center of a master antenna from said plurality of GNSS receiver antennas.

12. The navigation system of claim 9, wherein:
the known attitude of said rigid array and the measured phase difference between said pair of GNSS receiver antennas are used for resolving line biases on a baseline; and
the known attitude is determined by comparing a difference in carrier phases at a common frequency measured between said pair of GNSS receiver antennas, and using a known line of sight to a plurality of transmitted signal sources.

13. A method for determining position of an array of receiver antennas, the method comprising:
using a plurality of GNSS receiver antennas,
wherein at least a first GNSS receiver antenna of said plurality of GNSS receiver antennas has a complementary frequency capability with respect to a second GNSS receiver antenna of said plurality of GNSS receiver antennas;
wherein, the first GNSS receiver antenna is separated from the second GNSS antenna by a physical spacing of at least 0.1 cycles of a highest frequency wavelength operable with the plurality of GNSS receiver antennas; and
wherein, phases from the first and second GNSS receiver antennas are projected to a common physical point based on a relative position between the first and second GNSS receiver antennas.

14. The method of claim 13, further comprising receiving signals in one or more passbands by at least two antenna of said plurality of GNSS receiver antennas, and when taken together, said plurality of GNSS receiver antennas receive signals in at least three passbands.

15. The method of claim 13, further comprising receiving signals in one passband by at least two antenna of said plurality of GNSS receiver antennas, and when taken together, said plurality of GNSS receiver antennas receive signals in at least two passbands.

16. The method of claim 13, wherein the array is a rigid array of known dimensions.

17. The method as in claim 13, wherein the complementary frequency capability of the at least first GNSS receiver antenna with respect to the second GNSS receiver antenna means that one of the first and second receiver antenna has the ability to receive signals in a frequency band that the other one of the first and second receiver antenna cannot receive.

18. The method as in claim 13, wherein the receiver antenna comprises either one element or two stacked elements that admit signals in either one or two defined radio frequency bands.

19. The method as in claim 13, wherein a receiver antenna comprises a set of independent antenna elements affixed in a known arrangement to a rigid substrate.

20. The method of claim 16, further comprising sharing a common passband by a pair of GNSS receiver antennas on said rigid array and receiving signals from one or more transmit sources that are transmitting in said common passband, and using a known attitude of said rigid array and a measured phase difference between said pair of GNSS receiver antennas to project phases from all passbands to the common physical point.

21. The method of claim 20, further comprising using said known attitude for projecting phase data from said plurality of GNSS receiver antennas to the common physical point.

22. The method of claim 20, wherein:
the known attitude of said rigid array and the measured phase difference between said pair of GNSS receiver antennas are used for resolving line biases on a baseline; and
the attitude is determined by comparing a difference in carrier phases at a common frequency measured between said pair of GNSS receiver antennas, and using a known line of sight to a plurality of transmitted signal sources.

23. The method of claim 21, wherein said common physical point is a phase center of a master antenna from said plurality of GNSS receiver antennas.

24. A method for combining a plurality of signal frequencies associated with Global Navigation Satellite System (GNSS) constellations by an array of receiver antennas, the method comprising:

providing a plurality of receiver antennas including a first antenna and a second antenna in an array, each of the receiver antennas adapted to receive at least one GNSS signal frequency and optionally a plurality of GNSS signal frequencies, wherein at least some of the receiver antennas are adapted to receive mutually complementary frequencies with respect to other of the receiver antennas such that one of the first and second receiver antenna has the ability to receive signals only in a frequency band that the other one of the first and second receiver antenna cannot receive;

operating the plurality to receiver antennas to receive a plurality of GNSS signals in their respective frequency bands; and combining the received signals from each of the plurality of receive antennas to generate data associated with all of the frequencies received by all of the receive antennas;

wherein, the first antenna is separated from the second antenna by a physical spacing of at least 0.1 cycles of a highest frequency wavelength operable with the plurality of receiver antennas; and wherein, phases from the first and second receiver antennas are projected to a common physical point based on a relative position between the first and second receiver antennas.

25. The method as in claim 24, wherein none of the receiver antennas are adapted to individually receive all of the frequencies that are generated by the combination.

26. A navigation system for determining position of an array of receiver antennas, the navigation system comprising:

a plurality of GNSS receiver antennas including a first GNSS receiver antenna and a second GNSS receiver antenna, the first GNSS receiver antennas having mutually complementary frequency capability with respect to the second GNSS receiver antenna;

the first GNSS receiver antenna being separated from the second GNSS antenna by a physical spacing of at least 0.1 cycles of a highest frequency wavelength operable with the plurality of GNSS receiver antennas; and wherein phase data from the first and second GNSS receiver antennas are projected to a common physical point based on a relative position between the first and second GNSS receiver antennas.

27. The system as in claim 26, wherein the mutually complementary frequency capability of the first GNSS receiver antenna with respect to the second GNSS receiver antenna in the navigation system is such that one of the first GNSS receiver antenna and the second GNSS receiver antenna has the ability to receive signals in a frequency band that the other one of the first and second GNSS receiver antenna cannot receive.

28. The system of claim 27, wherein:

a pair comprising two of said plurality of GNSS receiver antennas on said array share a common passband and receive signals from one or more transmit sources that are transmitting in said common passband;

a known attitude of said array and a measured phase difference between said pair of GNSS receiver antennas are used for resolving line biases on a baseline;

said known attitude is determined by comparing a difference in carrier phases at a common frequency measured between said pair of GNSS receiver antennas, and by using a known line of sight to a plurality of transmitted signal sources; and said known attitude is used for projecting the phase data from one or more of said plurality of GNSS receiver antennas to the common physical point and said common physical point is a phase center of a designated master antenna from among said plurality of GNSS receiver antennas.

29. A method for determining position of an array of comprising a plurality of GNSS receiver antennas, the method comprising:

providing a first GNSS receiver antenna and a second GNSS receiver antenna of the plurality of GNSS receiver antennas;

configuring the first GNSS receiver antenna to have a complementary frequency capability with respect to the second GNSS receiver antenna;

separating the first GNSS receiver antenna from the second GNSS antenna by a physical separation of at least 0.1 cycles of a highest frequency wavelength operable with the plurality of GNSS receiver antennas; and projecting phase data from the first GNSS receiver antennas and the second GNSS receiver antennas to a common physical point based on a relative position between the first and second GNSS receiver antennas.

30. The method as in claim 29, wherein the mutually complementary frequency capability of the first GNSS receiver antenna with respect to the second GNSS receiver antenna is such that one of the first GNSS receiver antenna and the second GNSS receiver antenna has the ability to receive signals in a frequency band that the other one of the first and second GNSS receiver antenna cannot receive.

31. The method of claim 30, further comprising:

configuring a pair comprising two of said plurality of GNSS receiver antennas on said array to share a common passband and to receive signals from one or more transmit sources that are transmitting in said common passband;

determining a known attitude by comparing a difference in carrier phases at a common frequency measured between said pair of GNSS receiver antennas and by using a known line of sight to a plurality of transmitted signal sources;

using the known attitude of said array and a measured phase difference between said pair of GNSS receiver antennas for resolving line biases on a baseline; and using the known attitude for projecting the phase data from one or more of said plurality of GNSS receiver antennas to the common physical point where said common physical point is a phase center of a designated master antenna selected from among said plurality of GNSS receiver antennas.

32. The method of claim 31, wherein:

the method creates a multiple frequency composite receiver antenna from the plurality of separate physically spaced receiver antenna elements and the resulting composite multiple frequency receiver antenna is used to produce phase measurements at all of the frequencies of the plurality of antennas, and wherein the phase measurements at every frequency appear to be generated at a common physical point.

33. A system comprising:

a plurality of GNSS receiver antennas including a first GNSS receiver antenna and a second GNSS receiver antenna;

the first GNSS receiver antennas having mutually complementary frequency capability with respect to the second GNSS receiver antenna;

the first GNSS receiver antenna is separated from the second GNSS antenna by a physical spacing of at least 0.1 cycles of a highest frequency wavelength operable with the plurality of GNSS receiver antennas;

a multiple-frequency composite receiver antenna is synthesized from the plurality of physically spaced receiver antennas and the resulting multiple-frequency composite receiver antenna is used to generate phase measurements at all of the operating frequencies of the plurality of receiver antennas; and the phase measurements at all of the operating frequencies of the plurality of receiver antennas including of the first and second GNSS receiver antennas are projected to and appear to be generated from a common physical point.

* * * * *